United States Patent
Kitamura et al.

[15] 3,707,333
[45] Dec. 26, 1972

[54] HEADSTOCK BALANCING CONSTRUCTION FOR MACHINE TOOLS

[72] Inventors: Tetsuo Kitamura; Akira Tamai, both of Hiroshima, Japan

[73] Assignee: Mitsubishi Jukogyo Kabushiki Kaisha, Tokyo, Japan

[22] Filed: July 13, 1970

[21] Appl. No.: 54,150

[52] U.S. Cl. .................................408/235, 90/11 R
[51] Int. Cl. .............................................B23b 47/26
[58] Field of Search............90/15, 16, 11 R; 408/235

[56] References Cited

UNITED STATES PATENTS

| | | | |
|---|---|---|---|
| 3,580,133 | 5/1971 | Berthiez | 90/11 R |
| 3,168,000 | 2/1965 | Deflandre | 408/235 |
| 3,546,979 | 12/1970 | Noguchi | 408/235 |

FOREIGN PATENTS OR APPLICATIONS 885,426   12/1961   Great Britain.......................408/235

*Primary Examiner*—Gil Weidenfeld
*Attorney*—McGlew and Toren

[57] ABSTRACT

The headstock of a machine tool, and the saddle supporting the headstock, are independently connected to respective counter weights by flexible connectors such as ropes, chains, or the like. A column is interposed between the headstock and saddle assembly and the counter weights, and the assembly and the counter weights are movable along opposite surfaces of the column. An arm is supported at the top of the column and has a tubular pivot at one end and which has a vertical axis, and bearing means are provided between the top of the column and an intermediate portion of the arm. The arm carries two pulleys, one at each end, over which the connecting element for the headstock extends. A first joint connects one end of the connecting element to the counter weight and can perform correction movements in one direction, and a second joint connects the opposite end of the connecting element to the headstock and can perform correction movements in three dimensions.

8 Claims, 6 Drawing Figures

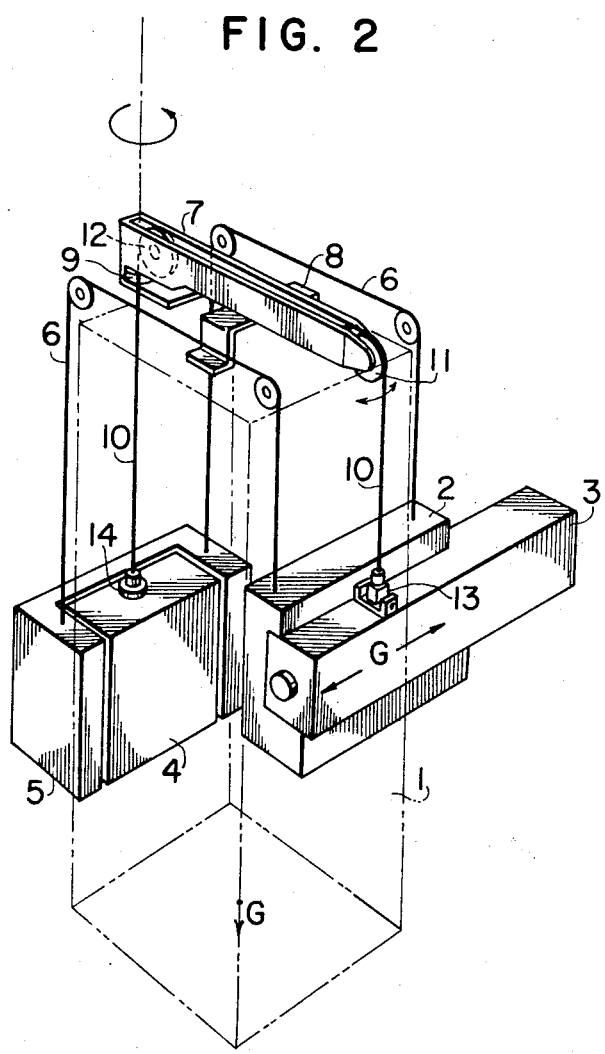

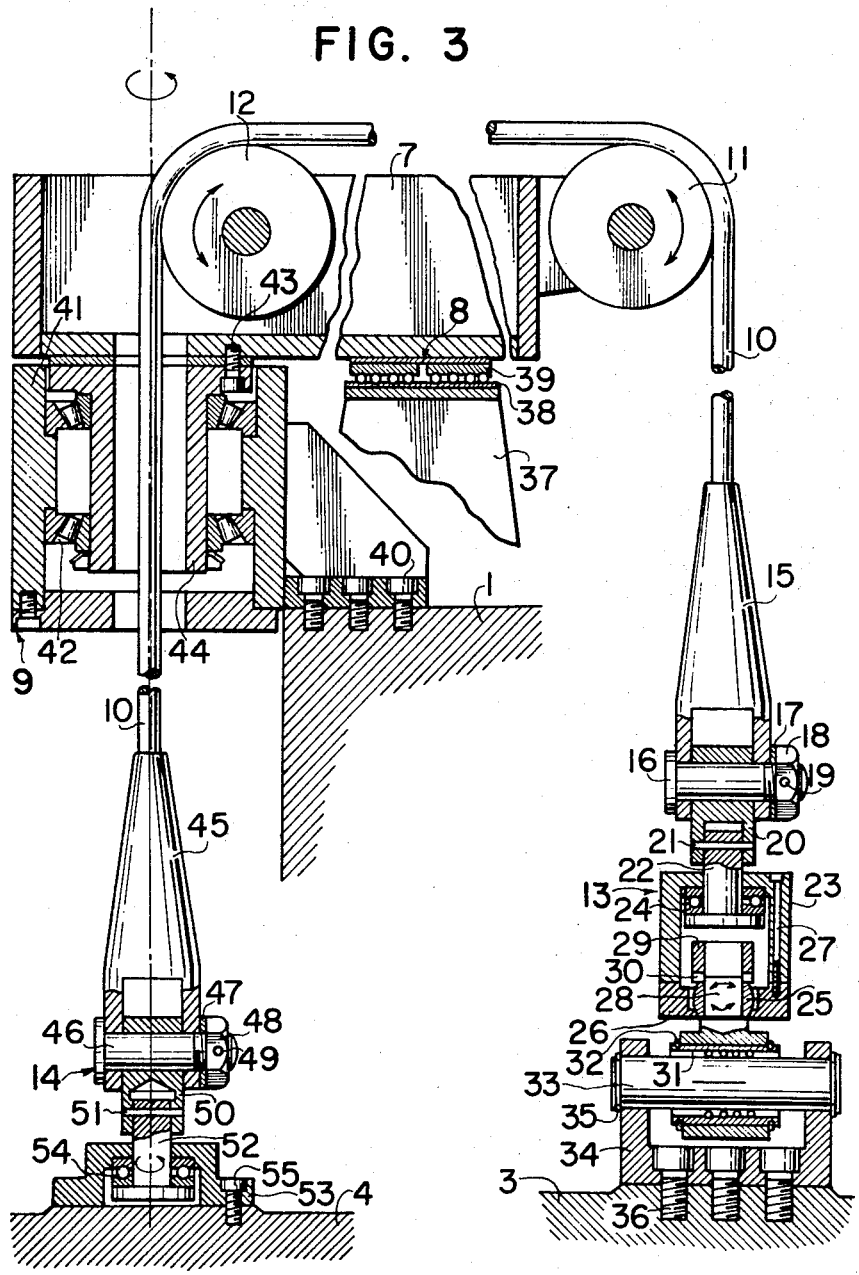

HEADSTOCK BALANCING CONSTRUCTION FOR MACHINE TOOLS

BACKGROUND OF THE INVENTION

In conventional machine tools, such as shown FIGS. 1a through 1d, the weight of a saddle b is counterbalanced by a counter weight W connected to the saddle by one or more flexible connecting elements, a, such as ropes or chains. A headstock c is mounted in or supported by saddle b for lateral displacement.

In FIG. 1a, a single flexible connector a is used and, as headstock c is laterally displaced relative to saddle b, saddle b will tilt about the suspension point as the center in accordance with the lateral displacement of headstock c. As a result, there is a torsion force exerted in the narrow guide between the saddle and a column, and headstock c is excessively displaced.

In FIG. 1b, saddle b and headstock c are connected to the counter weight W by two flexible connectors, so that the center of gravity G of the assembly is not displaced to any great extent. On the other hand, however, saddle b is tilted due to stretching of connector a by the change in tension thereon resulting from lateral displacement of headstock c, so that headstock c is displaced.

In FIG. 1c, the stretching of connectors a is compensated by means of an oil hydraulic device d, but this arrangement results in a complication of the construction. In addition, the arrangement of FIG. 1c has the disadvantage that displacement of headstock c due to changes in the distribution of load applied to the sliding surface of saddle b, supporting headstock c, by lateral displacement of headstock c, cannot be prevented.

In the arrangement shown in FIG. 1d, saddle b is provided with a cam e engaged by a roller f and headstock c, whereby headstock c is forcibly elevated, upon movement to the left as viewed in FIG. 1d, to compensate for tilting of saddle b due to such movement of headstock c. However, this construction has the disadvantage that torsion results from the lifting of headstock c into engagement with the upper sliding surface of saddle b, so that smooth displacement of headstock c cannot be obtained.

In each of the examples shown in FIGS. 1a through 1d, counter weight W is housed in the interior of the column, and thus the saddle and the headstock are subjected to irregularly distributed pressure with respect to the column.

The arrangements shown in FIGS. 1a through 1d are used in large machine tools. With the trend to machining ever larger workpieces, it is inevitable that the dimensions of machine tools must also be increased. However, if conventional balancing constructions are used without any modification, the disadvantages inherent in these conventional constructions will be even more pronounced. As a result machining accuracy is reduced, so that there is a necessity for improving the balancing constructions.

The factors contributing to these disadvantages of conventional constructions have been investigated, and it has been found that these disadvantages are caused by the fact that deleterious effects, such as torsion, tilting, etc., exerted on the saddle when the very heavy headstock is moved with respect to the saddle cannot be completely eliminated. It has also been found that the sliding motion along the column cannot be performed smoothly, due to the unbalance of the surface pressure between the sliding surfaces of the column base and the bed supporting the column base, because the counter weight is housed interiorly of the column.

SUMMARY OF THE INVENTION

This invention relates to headstock balancing arrangements for machine tools and, more particularly, to a novel and improved headstock balancing arrangement whereby the foregoing disadvantages of prior art constructions are eliminated.

In accordance with the invention, the counter weights move along an exterior surface of a column which is opposite to an exterior surface along which a saddle and a headstock move, so that the column is interposed between the saddle and headstock assembly and the counter weight or counter weights. This insures application of uniform surface pressures or stresses to the column base and the sliding surface of a bed, thus providing smooth sliding of the column on the bed. The counter weight is connected to the headstock through special connecting means to assure smooth sliding of the headstock on the saddle without causing any undue force between the headstock and the sliding surface of the saddle when the headstock is laterally displaced.

In accordance with the invention, the headstock, and the saddle supporting the headstock, are independently connected to the respective counter weights through flexible connectors such as ropes, chains, or the like. An arm having, at opposite ends, pulleys over which extend the flexible connector connecting the headstock to its associated counter weights, is supported on top of the column so that it can oscillate in a horizontal plane about a vertical axis which is coincident with the vertical run of the flexible connector extending from a pulley to the counter weight.

An object of the invention is to provide an improved headstock balancing arrangement for machine tools.

Another object of the invention is to provide such a balancing arrangement improving the accuracy of machining.

A further object of the invention is to provide such a balancing arrangement assuring application of uniform pressures between the column base and the sliding surface of the bed.

A further object of the invention is to provide such a balancing arrangement facilitating lateral displacement of a headstock in a saddle without undue stress between the headstock and the sliding surface on the saddle.

For an understanding of the principles of the invention, reference is made to the following description of a typical embodiment thereof as illustrated in the accompanying drawings.

BRIEF DESCRIPTION OF THE DRAWINGS

In the drawings:

FIG. 2 is a schematic prospective view of a balancing construction embodying the invention; and FIG. 3 is a part elevational and part sectional view of the balancing construction shown in FIG. 2.

DESCRIPTION OF THE PREFERRED EMBODIMENT

Figure 1A:
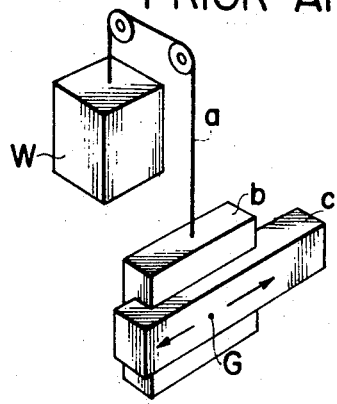
FIGS. 1a through 1d are schematic prospective views of known headstock balancing constructions.
Figure 1B:
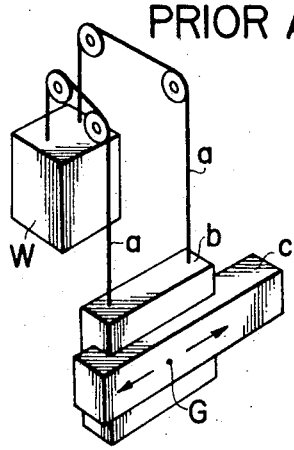
Figure 1C:
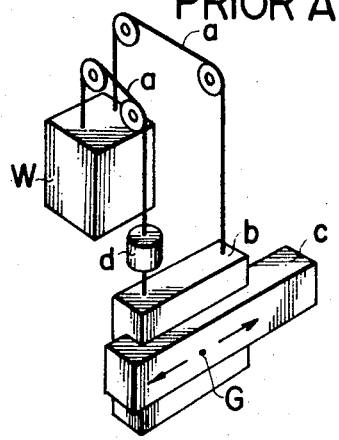
Figure 1D:
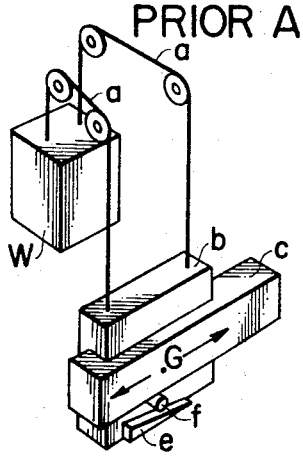

Referring first to FIG. 2, the machine tool includes an upright column 1. A saddle and headstock assembly, comprising a saddle 2 slidably supporting a headstock 3, is displaceable along one surface of column 1, and counter weights 4 and 5 are displaceable along the opposite external surface of column 1. Saddle 2 is counter balanced by connecting it to counter weight 5 by means of flexible connectors 6, such as chains or ropes, extending over pulleys on the upper end of column 1. For the purpose of balancing headstock 3, there is provided a balancing mechanism comprising an arm 7, a support 8 engageable with arm 7 intermediate its ends, and a pivot shaft 9 oscillatable in column 1 and connected to one end of arm 7. Pulleys 11 and 12 are provided at opposite ends of arm 7, and headstock 3 is connected to counter weight 4 by a flexible connector 10, such as a rope, cable, or chain trained over pulleys 11 and 12.

A correcting mechanism 13, capable of performing correction or compensating movements in three mutually perpendicular dimensions or directions, connects headstock 3 with flexible connector 10, and a correcting mechanism 14, capable of performing correction or compensation movements in one dimension or direction connects counter weight 4 with flexible connector 10.

In FIG. 3, which illustrates the detailed construction of each component, the three-dimensional correcting or compensating mechanism 13 includes a bar or the like 20 connected to a rope or cable socket 15 by means of a pivot bolt 16, a washer 17, a nut 18 and a pin 19 anchoring nut 18 in a fixed position on bolt 16. A shaft 22 is threaded into a threaded recess in bar 20, and anchored against rotation relative to bar 20 by a pin 21. Shaft 22 extends through an aperture in the base of an inverted channel member 23, and a thrust ball bearing 24 is interposed between the head of shaft 22 and the base so as to provide for relative rotation between these parts. Channel member 23 is closed by a cover 26 secured to member 23 by bolts 27, cover 26 being provided with a spherical or ball and socket bearing 25 providing for free angular displacement of member 23.

A hanger 28 extends through the ball of bearing 25 and is secured thereto by a nut 29 with the interposition of a washer 30. A linear ball bearing assembly 31 is secured in hanger 28 by snap rings 32 and is freely displaceable axially of a pin 33 secured to a support 34 by snap rings 35. Support 34 is secured to headstock 3 by bolts 36. By virtue of the thus described construction, corrections or compensations in three directions are effected at three locations, that is, at thrust ball bearing 24, spherical bearing 25 and linear ball bearing 31.

The support 8, engaging the intermediate portion of arm 7, comprises a bridge 37 secured to the upper end of column 1 by bolts; a hardened steel plate 38 on the upper surface of bridge 37, and flat ball bearing assemblies 39 mounted on arm 37. By means of ball bearings 39, arm 7 can oscillate smoothly over bridge 37.

The pivot assembly 9 for arm 7 includes a housing 41 secured to column 1 by bolts 40 and mounting tapered roller bearings 42 which rotatably support a tubular shaft 44 secured to the undersurface adjacent one end of arm 7 by bolts 43. Tubular shaft or pivot 44 thus is able to rotate about an axis which is coincident with the vertical run of flexible connector 10 extending through shaft 44.

The mechanism 14 connecting counter weight 4 are flexible connector 10, and providing for correction or compensation movements in one dimension or direction, includes a bar or the like 50 connected to a rope socket 45 by a pivot bolt 46, a washer 47, a nut 48 and a stop pin 49 maintaining nut 48 in an adjusted position. A shaft 52 is threaded into a threaded recess in bar 50 and is secured against rotation by a detent pin 51. Shaft 52 has a head at its lower end, and extends upwardly through an aperture in the base of a channel member 53. A thrust ball bearing 54 is interposed between the head of shaft 52 and the base of member 53 to provide for relative rotation of these parts in a horizontal plane. Member 53 is secured to counter weight 4 by bolts 55.

The operation of the balancing arrangement will be clear from the following description. In conventional machine tool balancing arrangements, counter weights are housed within a column. By contrast, in the balancing arrangement of the present invention, the counter weights 4 and 5 are positioned externally of the column on that external surface thereof which is opposite the external surface along which slide the saddle 2 and the headstock 3, as shown in FIG. 2, so that the center of gravity of the entire machine is at the center of column 1. In addition, intermediate support 8 is substantially midway between pulleys 11 and 12, in order to minimize the displacement of the center of gravity of the entire machine due to transverse displacement of headstock 3. The weight of headstock 3 and counter weight 4 as applied to arm 7 is carried by intermediate support 8.

Referring to FIG. 2, saddle 2 is independently counter balanced by counter weight 5 through the medium of two flexible connectors 6. Headstock 3 is counter balanced independently by counter weight 4 through the medium of arm 7, with the center of gravity of the headstock being connected to counter weight 5 through flexible connector 10. When headstock 3 is moved transversely, arm 7 oscillates on intermediate support 8 above an axis which is coincident with the axis of that vertical run of flexible connector or rope 10 connected to counter weight 4, so that arm 7 will oscillate about this axis. Since the center of gravity of headstock 3 is always counter balanced by counter weight 4, the weight of headstock 3 operative on the sliding surfaces of saddle 2, constituting the headstock supporting surfaces, is decreased, and the tension of the flexible connectors 6 serving to balance saddle 2 does not undergo any change. Consequently, headstock 3 is not tilted and can slide smoothly in saddle 2.

The function of each unit will be described in detail with reference to FIG. 3. When headstock 3 is displaced laterally, arm 7 is turned, in synchronism with the displacement of headstock 3, about the axis of tubular shaft 44 having the flexible connector 10 extending axially thereof. The two sets of taper roller bearings 42 on shaft 44 serve to provide for smooth oscillation of arm 7. Since counter weight 4 does not oscillate when arm 7 is turned, torsion is developed between pulley 12 and counter weight 4. This torsion is corrected by the rotation of thrust ball bearing 54 located in the one-dimensional correcting or compensating mechanism 14.

Arm 7 oscillates while headstock 3 moves linearly, and therefore a phase in the radial direction, with respect to the pivot or rotational center of arm 7, is developed between the point suspending headstock 3 and the pulley 11. Since the rotational movement of arm 7 is accomplished responsive to the linear motion of headstock 3, through flexible connector 10, there is a small time lag between the linear movement of headstock 3 and the rotational or oscillatory motion of arm 7. Flexible connector 10 is tilted due to this time lag. When arm 7 is turned, torsion is developed between headstock 3 and pulley 11 in the same manner as between pulley 12 and counter weight 4.

As is mentioned above, corrections or compensations in three directions are required between pulley 11 and headstock 3. These include correction of the phase in the radial direction, correction of the tilting of rope 10 due to the time lag, and correction of the torsion of rope or flexible connector 10 due to turning of arm 7. The three-dimensional correcting or compensating mechanism 13 performs these corrections or compensations in three directions. The phase in the radial direction is corrected or compensated by movement of the linear ball bearing 31 on pin 33. Tilting of flexible connector 10 due to the time lag, mentioned above, is corrected by turning of member 23 through spherical bearing 25. Finally, the torsion of flexible connector 10, due to the turning of arm 7, is corrected by rotation of thrust ball bearing 24.

Intermediate support 8 is provided with flat ball bearings 39 so as to provide for smooth rotation of arm 7. The upper surface of bridge 37 is covered with hardened steel plate 38 to improve the rolling action of ball bearing 39. Counter weight 4 is provided within counter weight 5, and is arranged to move vertically while being guided by a part of counter weight 5. This is because of the tilting of flexible connector 10 caused by the time lag between the movement of arm 7 and that of headstock 3. The tilting of flexible connector 10 necessitates lifting counter weight 4 by the amount equal to the tilting or swinging of the rope or flexible connector 10.

As mentioned above, the disadvantages of conventional balancing arrangements are obviated by the balancing construction of the invention. The decrease in accuracy, due to the development of local stresses or elastic deformation in the sliding surfaces between saddle 2 and column 1, and between saddle 2 and headstock 3, is eliminated, thus assuring maintenance of horizontal orientation with respect to the transverse movement of headstock 3. Additionally, as displacement of the position of the center of gravity of the entire machine is obviated, tilting of column 1 is prevented. Furthermore, since the center of gravity of the entire machine is at the center of the machine, the surface pressure of the sliding surfaces of the column base and the bed is uniform, and column feed can be accomplished smoothly. As a result, the machining accuracy is greatly improved.

While specific embodiment of the invention has been shown and described in detail to illustrate the application of the principles of the invention, it will be understood that the invention may be embodied otherwise without departing from such principles.

What is claimed is:

1. In a machine tool of the type including a support column, a saddle movable along the column, a headstock mounted in the saddle for lateral displacement, counter weight means movable along the column, an arm supported on the upper end of the column for pivoting in a substantially horizontal plane about a substantially vertical pivot axis, a pair of pulleys rotatably mounted on the arm in spaced relation therealong for rotation about substantially horizontal axes and a flexible connector trained over the pulleys and including a horizontal run extending along the arm, a first vertical run connected to the headstock and a second vertical run connected to the counter weight means: an improved balancing arrangement for the headstock comprising, in combination, a counter weight included in said counter weight means and displaceable along that vertical surface of said column opposite to the vertical surface along which said saddle and said headstock assembly are displaceable; and said substantially vertical pivot axis for said arm being axially coincident with said second vertical run; said second vertical run being connected to said counter weight.

2. An improved balancing arrangement, as claimed in claim 1, including means supporting said arm at substantially the midpoint thereof on the upper end surface of said column, and providing for free swinging of said arm over said upper end surface.

3. In a machine tool of the type including a support column, a saddle movable along the column, a headstock mounted in the saddle for lateral displacement, counter weight means movable along the column, and flexible connector means connecting the saddle and headstock assembly to the counter weight means; an improved balancing arrangement for the headstock comprising, in combination, an arm supported on the upper end of said column for pivoting in a substantially horizontal plane about a substantially vertical pivot axis; a pair of pulleys rotatably mounted on said arm in spaced relation therealong for rotation about substantially horizontal axes; said counter weight means comprising a counter weight displaceable along said column opposite said saddle and headstock assembly; a flexible connector trained over said pulleys and including a horizontal run extending along said arm, a first vertical run connected to said headstock, and a second vertical run connected to said counter weight; said second vertical run of said flexible connector being coincident with said substantially vertical pivot axis of said arm; and a tubular arm rotatably supported on said column for rotation about a vertical axis and connected to said arm to form the pivot for said arm; said second vertical run of said flexible connector extending coaxially through said tubular arm.

4. An improved balancing arrangement, as claimed in claim 1, including first joint means connecting said first vertical run to said headstock and including first bearing means providing for relative rotation between said headstock and said first vertical run, second bearing means providing for angular adjustment between said headstock and said first vertical run, and third bearing means providing for a lateral displacement between said headstock and said first vertical run.

5. An improved balancing arrangement, as claimed in claim 4, including a second joint connecting said second vertical run to said counter weight and including bearing means for providing for relative rotation between said counter weight and said second vertical run.

6. An improved balancing arrangement, as claimed in claim 2, in which said support is located substantially on the center line of said column, and includes antifriction means arranged between said column and said arm.

7. An improved balancing arrangement, as claimed in claim 1, in which said counter weight means comprises a second counter weight displaceable along said column opposite said saddle and headstock assembly; and flexible connector means connecting said second counter weight to said saddle independently of the flexible connector connecting said headstock to said first counter weight.

8. An improved balancing arrangement, as claimed in claim 7, in which said second counter weight at least partially embraces, in sliding relation, said first counter weight.

* * * * *